United States Patent [19]
Ten Eyck

[11] Patent Number: 5,990,813
[45] Date of Patent: Nov. 23, 1999

[54] METHOD AND APPARATUS FOR SYNCHRONIZING EXTERNAL DATA TO AN INTERNAL TIMING SIGNAL

[75] Inventor: Timothy A. Ten Eyck, Denison, Tex.

[73] Assignee: Texas Instruments Incorporated, Dallas, Tex.

[21] Appl. No.: 08/921,873

[22] Filed: Aug. 22, 1997

[51] Int. Cl.$^6$ ....................................................... H03M 9/00
[52] U.S. Cl. .............................................................. 341/100
[58] Field of Search ........................................ 341/100, 101

[56] References Cited

U.S. PATENT DOCUMENTS 4,630,291  12/1986  Lankar et al. ........................... 375/356
5,430,773   7/1995  Marbot .................................... 375/373

*Primary Examiner*—Howard L. Williams
*Attorney, Agent, or Firm*—April M. Mosby; W. James Brady; Richard L. Donaldson

[57] ABSTRACT

The invention discloses a method and system for synchronizing external data to an internal timing signal. External data is received in conjunction with a clock input. The clock input has first set of values and a second set of values. The clock input is compared to an internal timing signal having a frequency that is a multiple of the clock input. The internal timing signal is shifted by adjusting the count of a counter if the clock input transitions from the first set of values to the second set of values within a predetermined range of the internal timing signal.

16 Claims, 3 Drawing Sheets

METHOD AND APPARATUS FOR SYNCHRONIZING EXTERNAL DATA TO AN INTERNAL TIMING SIGNAL

TECHNICAL FIELD OF THE INVENTION

This invention relates generally to the field of signal processing and more particularly to a method and apparatus for synchronizing external data to an internal timing signal.

BACKGROUND OF THE INVENTION

When performing high frequency parallel to serial conversions, it is necessary to load parallel data into a shift register without corrupting the data. One problem that arises is the timing associated with loading the parallel data into the shift register. Typically, the parallel data is received at a known frequency that is related to the frequency of the serial data produced. For example, in an eight bit parallel to serial converter, the frequency of the serial data is eight times that of the parallel data. However, although the frequency of the incoming parallel data is known, its phase relationship with respect to a timing mechanism for clocking the parallel data into the shift register is not known. Due to this unknown phase relationship, the parallel data may be received by the shift register at the same instant that the parallel data is changing state. If that occurs, the data may be corrupted. Therefore, a need has arisen for a method and apparatus for synchronizing external data to an internal timing signal.

SUMMARY OF THE INVENTION

The invention comprises a method and apparatus for synchronizing external data to an internal timing signal. The method comprises receiving external data input in conjunction with a clock input. The clock input has first set of values and a second set of values. The method further comprises comparing the clock input to an internal timing signal and shifting the internal timing signal by adjusting the count of a counter if the clock input transitions from the first set of values to the second set of values within a predetermined range of the internal timing signal.

The apparatus comprises a comparator circuit operable to compare an associated clock signal to an internal timing signal. The apparatus also comprises a phase shift circuit operable to adjust the count of a counter if the clock input transitions from the first set of values to the second set of values within a predetermined range of the timing signal.

In another embodiment, a parallel to serial converter comprises a parallel data input operable to receive parallel data, the parallel data having an associated clock signal. The converter further comprises an associated clock signal input operable to receive the associated clock signal; a serial data output operable to transmit serial data; and a phase aligner circuit operable to synchronize the parallel data to an internal timing signal. The phase aligner circuit comprises a comparator circuit operable to compare the associated clock signal to an internal timing signal. The phase aligner circuit further comprises a phase shift circuit operable to adjust the count of a counter if the associated clock input transitions from the first set of values to the second set of values within a predetermined range of the internal timing signal.

The invention has several technical advantages. One technical advantage is that a method for synchronizing external data to an internal timing signal is provided. By synchronizing the data, data corruption is prevented thereby improving the reliability of any electronic circuit in which it is included. Another technical advantage is that the invention can be implemented with minimal power and silicon area increases. The invention is also easy to implement.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

The preferred embodiment of the present invention and its advantages are best understood by referring to FIGS. 1 through 4 of the drawings, like numerals being used for like and corresponding parts of the various drawings.

Figure 1A:
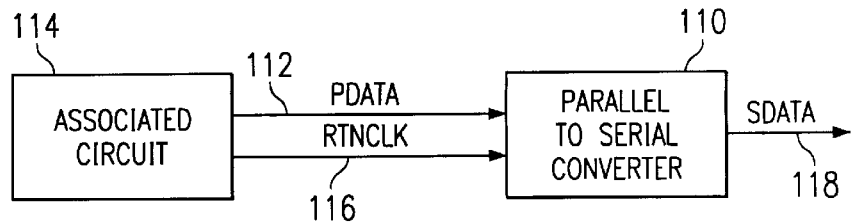
FIG. 1A illustrates an example embodiment of a parallel to serial converter constructed in accordance with the invention and connected to associated circuitry.

FIG. 1A illustrates an embodiment of a parallel to serial converter constructed in accordance with the invention and connected to associated circuitry. An eight bit parallel to serial converter 110 is shown receiving a parallel data signal or parallel data (PDATA) 112 from an associated system or circuit 114. Associated circuit 114 also provides a return clock signal (RTNCLK) 116 to converter 110. The converter 110 outputs a serial data signal (SDATA) or serial data 118. In one implementation of the embodiment shown in FIG. 1A, parallel to serial converter 110 converts high frequency parallel data to high frequency serial data. In that implementation, parallel data 112 is transmitted to converter 110 at a frequency of 77.76 MHZ and shifted out of the converter 110 as serial data 118 at a frequency of 622.08 MHZ. Converter 110 and associated circuit 114 are preferably formed on integrated circuits, and may be formed on the same integrated circuit.

Figure 1B:
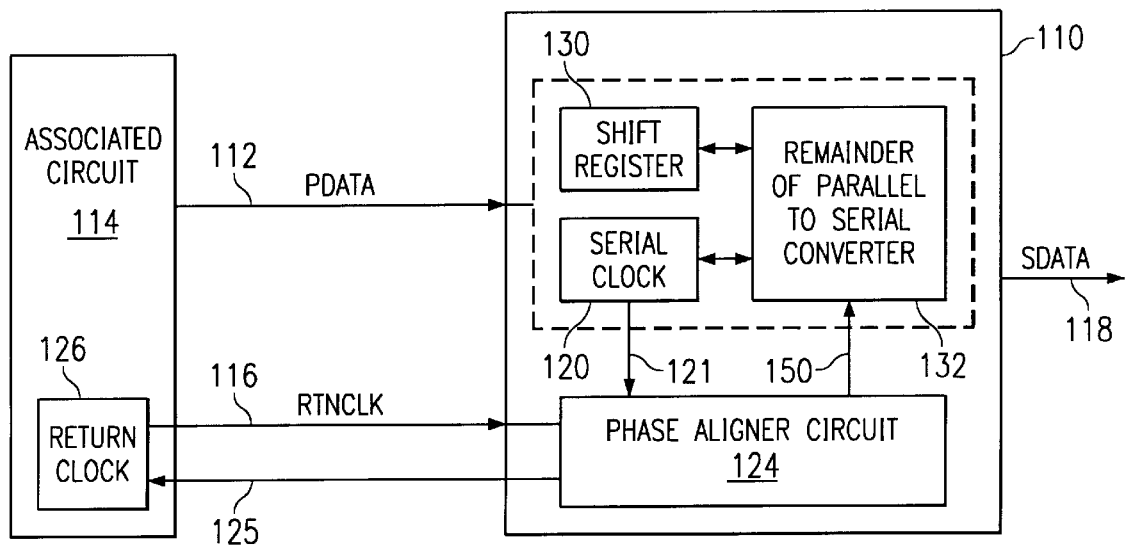
FIG. 1B illustrates additional details of the circuitry shown in FIG. 1A.

FIG. 1B illustrates additional details of the embodiment shown in FIG. 1A. Converter 110 comprises a serial clock 120. In this embodiment, serial clock 120 runs at a frequency of 622.08 MHZ but could run at any frequency. Receiving a serial clock output data signal or serial clock output (SCLK) 121 is phase aligner circuit 124. In this example, phase aligner circuit 124 provides a parallel clock data signal 125 at 77.76 MHZ to a return clock 126 but could run at any frequency. For the eight bit converter 110, the parallel clock signal 125 has a frequency of ⅛ that of serial clock 120. This frequency could vary depending upon the number of bits converted. Return clock 126 generates a return clock data signal (RTNCLK) 116, which is received by phase aligner circuit 124. Return clock signal 126 is used by phase aligner circuit 124 to coordinate the timing for shifting of parallel data 112 into shift register 130 of converter 110. Phase aligner circuit 124 produces a timing signal (PCLKI) 150, which is used by the remainder of the parallel to serial converter 132 to control shifting of parallel data 112 into shift register 130. For the eight bit converter 110, the timing signal PCLKI 150 has a frequency of 77.76 MHZ but could run at any frequency.

Figure 2:
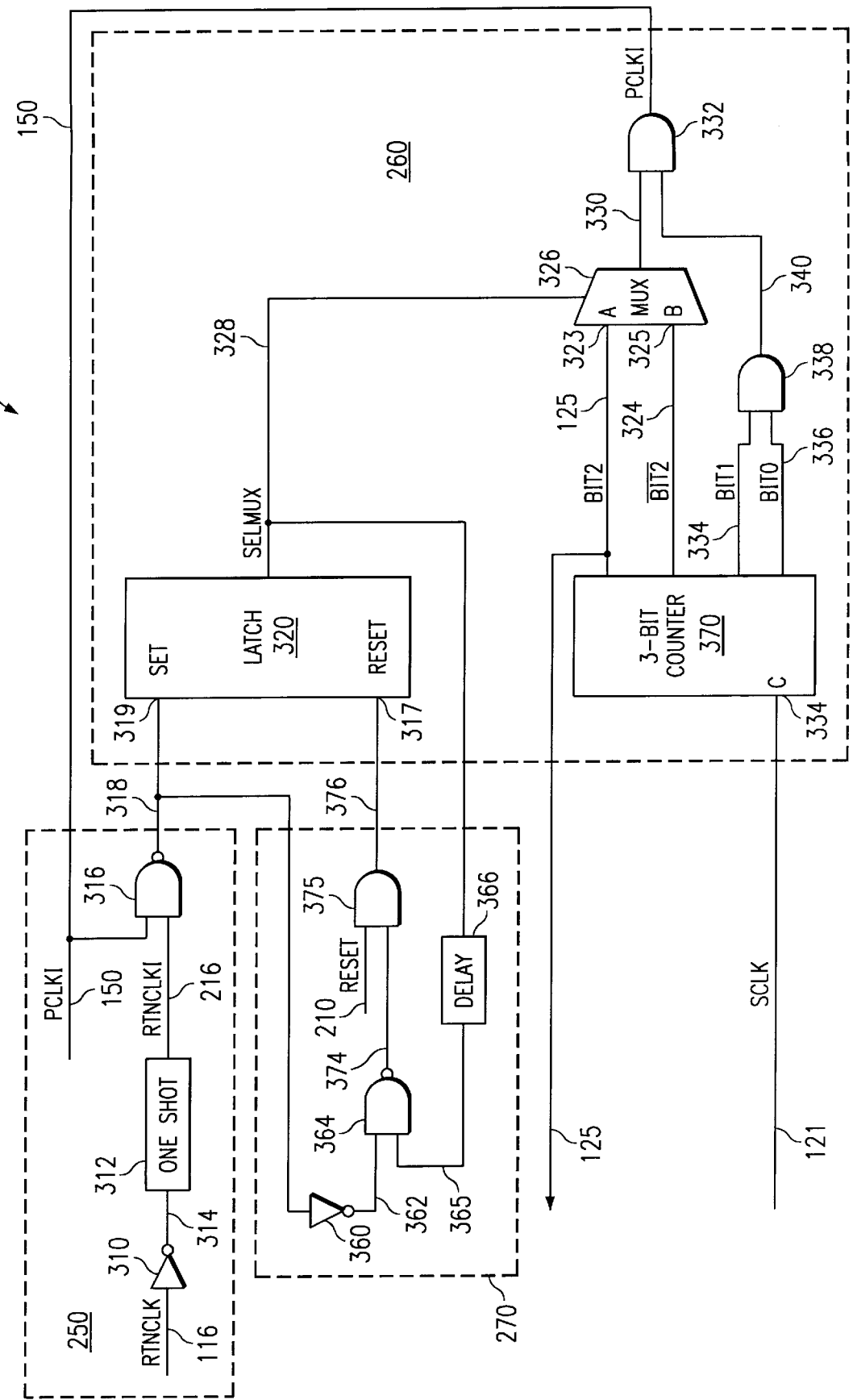
FIG. 2 illustrates an example phase aligner circuit that may be used in the parallel to serial converter shown in FIGS. 1A and 1B.
Figure 3:
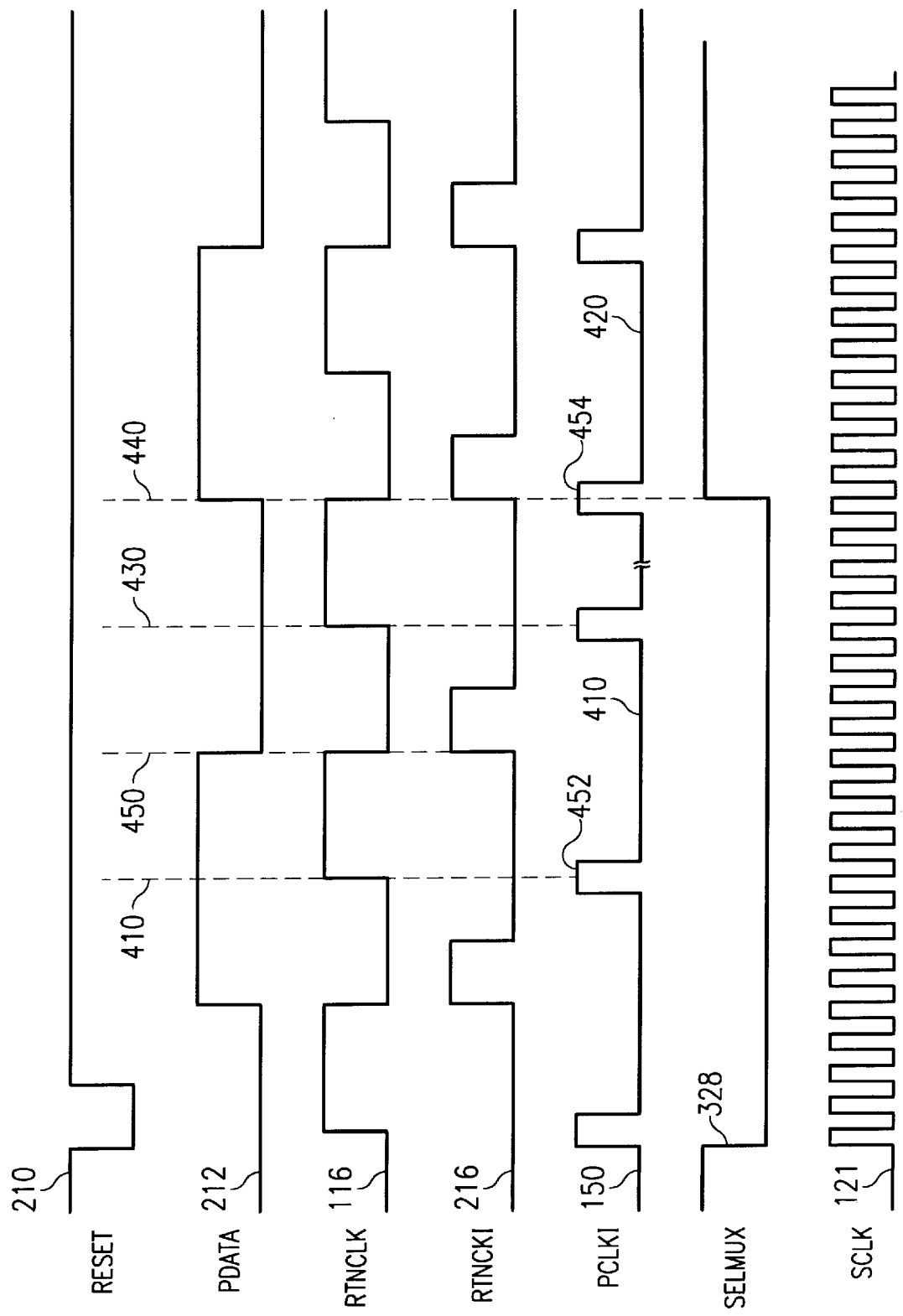
FIG. 3 is a timing diagram for various signals of the phase aligner circuit illustrated in FIG. 2.

FIG. 2 illustrates the phase aligner circuit used in the parallel to serial converter shown in FIGS. 1A and 1B. Phase aligner circuit 124 includes a comparator circuit 250. Comparator circuit 250 receives a return clock signal 116 from return clock 126. Return clock signal 116 is inverted by inverter 310 to provide the complement 314 of return clock signal 116. Complement 314 is received by oneshot circuit 312, which produces RTNCLKI 216, which is a modified form of return clock signal 116 having the same frequency but a shorter duty cycle, and which is shown in FIG. 3. Oneshot 312 comprises any type of oneshot that can produce a pulse function in response to a step function. In the implementation shown in FIG. 2, oneshot circuit 312 produces a pulse in response to the falling edge of return clock signal 116. RTNCLKI 216 provides one input to a comparator 316, which in this embodiment is NAND gate 316. The second input to NAND gate 316 is timing signal (PCLKI) 150, which is provided by the output of AND gate 332.

Phase aligner circuit 124 further comprises a phase shift circuit 260, which receives the output of NAND gate 316. NAND gate 316 provides a compare state or phase indicator 318. Compare state 318 is transmitted to the SET input 319 of latch 320. When output 318 is low, latch 320 is set. With latch 320 is set, latch output or latch setting SELMUX 328 is set high. Latch 320 is reset by providing a low signal to the RESET input 317 of latch 320. SELMUX 328 provides the control line for a selector, or in this embodiment, multiplexer 326. The inputs 323 and 325 of multiplexer 326 are provided by the most significant bit of three bit counter 370, as described below.

Figure 4:
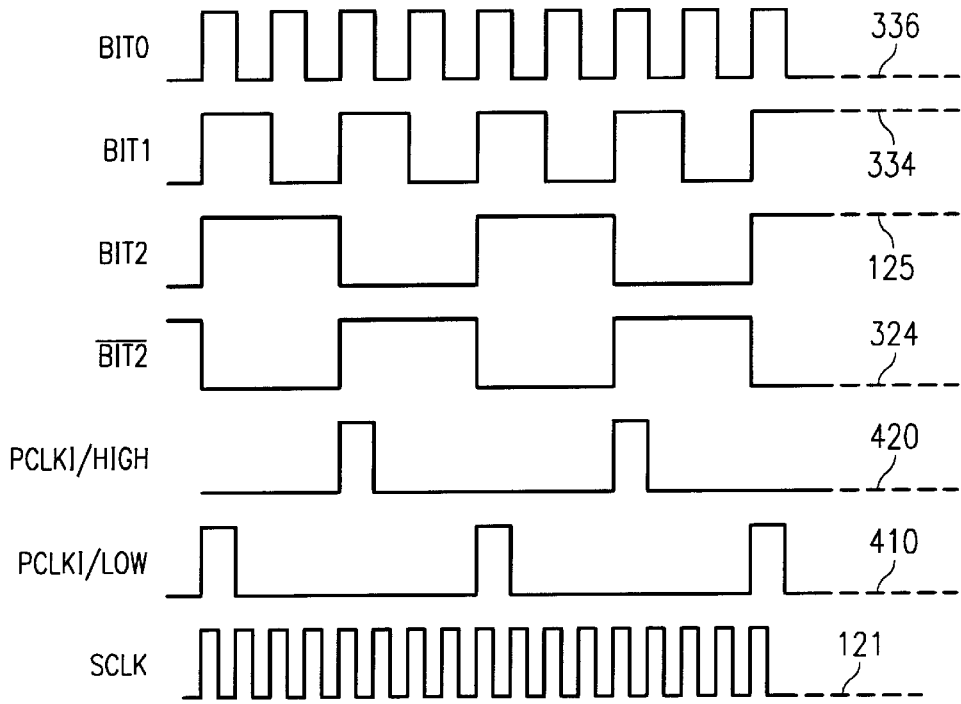
FIG. 4 is a second timing diagram of various signals of the phase aligner circuit illustrated in FIG. 2.

Three bit counter 370 receives serial clock output (SCLK) 121 at clock input 334. Three bit counter 370 produces a most significant bit 125 (BIT2) (which is also the parallel clock signal 125 provided to the return clock 126), the complement 324 of the most significant bit, a least significant bit 336 (BIT0), and a middle bit 334 (BIT1). The waveform for the most significant bit 125 is shown in FIG. 4. Most significant bit 125 provides a first input to multiplexer 326. Three bit counter 370 also produces the complement 324 of most significant bit 125 and provides it to the second input of multiplexer 326. FIG. 4 illustrates the waveform of complement 324. Mux output 330 is the same as most significant bit 125 if SELMUX 328 is high, and it is the complement 324 of most significant bit 125 if SELMUX is low. The other input to AND gate 332 is created from the other two outputs 334 and 336 of counter 370.

Middle bit 334 and least significant bit 336 are provided as inputs to AND gate 338. The output 340 of AND gate 338 provides the second input to AND gate 332. The output of AND gate 332, which compares Mux output 330 and output 340 of AND gate 338, produces timing signal (PCLKI) 150, which is also one input to NAND gate 316.

The phase aligner circuit 124 also contains a reshift circuit 270, which receives output 318 of NAND gate 316. This output is inverted by inverter 360. The resulting output 362 of inverter 360 provides one input to NAND gate 364. The other input to NAND gate 364 is delay output 365 from delay circuit 366. Delay circuit 366 receives as an input SELMUX 328 and produces a delayed output 365, which is SELMUX 328 but delayed at least one clock cycle of serial clock output 121.

The output 374 of NAND gate 364 provides one input to AND gate 375. The other input is global reset 374, which is tied high. These two signals are compared by AND gate 375, providing a latch reset signal 376 to latch 320, which resets the latch 320.

FIG. 3 is a timing diagram for various data signals of the phase aligner circuit 124 illustrated in FIG. 2. Serial clock output (SCLK) 121 as illustrated comprises a step function with a 50% duty cycle at 622.08 MHZ, but could have any frequency or duty cycle. Reset signal 210, which is a global reset for the converter 110, initializes converter 110 with one pulse. PDATA 212 represents one bit of the 8 bit parallel data 112 that is converted into serial data 118. In the example shown in FIG. 3, PDATA 212 is high for 8 cycles of serial clock output 121 (which is one cycle of return clock output 116), and low for 8 cycles of serial clock output 121. Return clock output 116 as illustrated in FIG. 4 comprises a step function with a frequency of ⅛ that of serial clock output 121 and with a duty cycle of 50%. Return clock output 116 is in phase (or edge aligned) with PDATA 212. In other words, PDATA 212, and therefore parallel data 112, can change states (from high to low or low to high) only in conjunction with the falling edge of return clock output 116. Lines 450 and 440 represent the times when PDATA 212, and therefore parallel data 112, can change state. The RTNCLKI 216, which is the modified form of return clock output 116 after being operated upon by one shot 312, is also phase aligned with PDATA 212; however, PDATA can change state only in conjunction with the rising edge of RTNCLKI 216. RTNCLKI 216 is a pulse function with a shorter duty cycle than return clock output 116 in this embodiment.

Timing signal PCLKI 150 has two different phase relationships with respect to PDATA 212 in this example. Aligned signal 410 of PCLKI 150 represents the ideal situation for the shift register 130 of converter 110 to receive data from associated circuit 114. Aligned signal 410 is high for one cycle of serial clock output 121. This cycle, for example, cycle 452 is centered with respect to PDATA 212, as denoted by line 410. Thus PDATA 212, and therefore parallel data 112, does not change states at the same time as aligned signal 410; PDATA 212 is unambiguously either zero or one while it is clocked into shift register 130 by aligned signal 410. Therefore, when timing signal PCLKI 150 is represented by an aligned signal 410, parallel data 112 may be clocked into the shift register 130 without a state change problem. However, this may not be the case when timing signal PCLKI 150 is represented by unaligned signal 420. Unaligned signal 420 changes state at the same time as PDATA 212, as denoted by line 440. In this situation, the value of PDATA 212 and parallel data 112 is in determinant, and shift register 130 does not know whether to load a zero or a one into shift register 130. SELMUX 328 changes from low to high, as shown in FIG. 3, based on the inputs to latch 320.

FIG. 4 is a second diagram of various signals of the phase aligner circuit illustrated in FIG. 2. In this example, the least significant bit 336 (BIT0) produced by counter 370 is a step function having a frequency equal to ½ that of serial clock output 121 and having a 50% duty cycle. The middle bit 334 (BIT1) produced by counter 370 is a step function having a frequency ¼ that of serial clock output 121 in this example. The most significant bit 125 produced by counter 370 has the shape shown in FIG. 4, which is a step function having a frequency ⅛ that of serial clock output 121. The complement 324 of most significant bit 125 is also illustrated. In its aligned state, timing signal PCLKI 150 takes the form of aligned signal 410, shown both in FIGS. 3 and 4. Aligned signal 410 provides a pulse every 8 cycles of serial clock output 121. Unaligned signal 420 is similar to aligned signal 410 except that it is shifted by four cycles of serial clock output 121 to allow for clocking-in of parallel data 112 in an unambiguous fashion.

To provide an understanding of the general operation of converter 110 and phase aligner circuit 124, a brief discussion is provided in general terms. Specific details of the embodiment shown in FIGS. 1–4 are given in the following paragraphs, and the scope of the invention is defined by the appended claims. Referring to FIGS. 1A and 1B, the converter 110 receives parallel data 112 from associated circuit 114. The parallel data 112 is clocked into shift register 130 based on the state of timing signal PCLKI 150. Although the parallel data 112 and the timing signal PCLKI 150 have the same frequency, the parallel data 112 is not necessarily in phase with the timing signal PCLKI 150. However, the return clock output 116 and the parallel data 112 are in phase with each other. Because timing signal PCLKI 150 and parallel data 112 are not necessarily in phase, the converter may attempt to clock the data into shift register at the instant the parallel data 112 is changing state, thus corrupting the parallel data 112. To avoid this problem, phase aligner circuit 124 determines, based on the return clock output 116, if the converter 110 is attempting to clock the parallel data 112 into shift register 130 when the parallel data 112 may change state. If so, the timing signal 150 is adjusted accordingly.

Referring now to FIGS. 1–4, the operation of converter 110 and phase aligner circuit 124 will now be described in detail. Shift register 130 of converter 110 receives parallel data 112 from associated circuit 114. The shift register 130 clocks in the parallel data 112 on the rising edge of timing signal PCLKI 150. To coordinate the clocking in of parallel data 112, the phase aligner circuit 124 receives return clock output 116 of return clock 126. The parallel data 112 and return clock output 116 are in phase, as illustrated by lines 450 and 440. The return clock output 116 is received by comparator circuit 250 of phase aligner circuit 124 and a comparison is performed to determine if the PDATA 212 changes state while the timing signal PCLKI 150 is high, which represents the period during which parallel data 112 is being clocked into shift register 130. If that is the case, latch 320 is set and the phase shift circuit 260 shifts the timing signal PCLKI 150 by four cycles to produce an aligned signal 410, which clocks parallel data 112 into shift register 130 only while the individual bits of parallel data 112 are unambiguously either one or zero.

If for some reason the timing signal PCLKI 150 becomes unaligned, the latch 320 is reset so that SELXMUX 328 is low, thereby shifting timing signal PCLKI 150 back 4 cycles of serial clock output 121. This reshifting of the timing signal PCLKI 150 and resetting of latch 320 is performed by reshift circuit 270. When compare circuit 250 detects that return clock output 116 changes state while the timing signal PCLKI 150 is high, which indicates that the timing signal PCLKI 150 is unaligned, the latch 320 is reset and the phase shift circuit shifts timing signal PCLKI 150 back by four cycles, reversing the original shift. Latch 320 is reset when reset 317 receives a low, which occurs when the output 374 of NAND gate 364 is low. The output 374 of NAND gate 364 is low when both the output of NAND 316 is low and delay output 365 is high. Output 374 of NAND gate 364 is low when return clock output 116 is changing state while the timing signal PCLKI 150 is high. Delay output 365 is high when latch 320 is set. Delay 366 delays its output 365 by more than one the width of one cycle of serial clock output 121, which prevents the latch from continuously setting and resetting. During the delay, output 318 of NAND 316 has time to change from low, which indicated that return clock output 116 was changing state while the timing signal PCLKI 150 was high, to a high state, which indicates that parallel data 112 is being clocked into shift register 130 only while the individual bits of parallel data 112 are unambiguously either one or zero. Thus the delay 366 prevents the latch 320 from immediately resetting after it is set.

Although the invention has been particularly shown and described by the foregoing detailed description, it will be understood by those skilled in the art that various other changes in form and detail may be made without departing from the spirit and scope of the invention, which is defined by the appended claims.

What is claimed is:

1. A method for synchronizing external data to an internal timing signal, the method comprising the steps of:

receiving external data input in conjunction with a clock input, the clock input having first set of values and a second set of values;

comparing the clock input to an internal timing signal;

shifting the internal timing signal by adjusting the count of a counter if the clock input transitions from the first set of values to the second set of values within a predetermined range of the internal timing signal; and wherein the step of adjusting the count of a counter comprises selectively inverting a most significant bit of the counter.

2. The method of claim 1 wherein the clock input and the timing signal have the same frequency.

3. The method of claim 1 wherein:

the internal clock signal has a first set of values and a second set of values; and adjusting the count of a counter comprises adjusting the count of a counter if the clock input transitions from the first set of values to the second set of values when the internal timing signal has a first value.

4. The method of claim 1 and further comprising the step of:

filtering the clock input signal to produce a filtered clock input; and wherein the step of comparing the clock input to an internal timing signal comprises determining if the filtered clock input and the internal timing signal have the same value.

5. The method of claim 3 and further comprising the step of:

filtering the clock input signal to produce a filtered clock input; and wherein the step of comparing the clock input to an internal timing signal comprises determining if the filtered clock input and the internal timing signal have the same value.

6. The method of claim 3 and further comprising producing a filtered first clock input signal, and wherein:

the step of comparing the first clock input to an internal clock signal comprises determining if the filtered first clock input and the internal clock signal have the same value; and the step of adjusting the count of a counter further comprises selectively inverting a most significant bit of the counter.

7. An apparatus for synchronizing external data having an associated clock signal to an internal timing signal, the apparatus comprising:

a comparator circuit operable to compare the associated clock signal to the internal timing signal;

a phase shift circuit operable to adjust the count of a counter if the clock input transitions from the first set of values to the second set of values within a predetermined range of the timing signal;

wherein the phase shift circuit is operable to adjust the count of a counter if the associated clock signal transitions from a first set of values to a second set of values when the internal timing signal has a first value; and wherein the phase shift circuit is further operable to selectively invert the most significant bit of the counter.

8. The apparatus of claim 7 wherein the internal timing signal has the same frequency as the associated clock signal.

9. The apparatus of claim 7 wherein the comparator circuit further comprises:

a oneshot operable to produce a pulse signal based on the associated clock signal; and a comparator operable to compare the values of the pulse signal and the internal timing mechanism.

10. The apparatus of claim 7 and further comprising a reshift circuit operable in conjunction with the phase shift circuit to compare the associated clock signal to the internal timing signal and adjust the count of the counter if the associated clock signal transitions from the first set of values to the second set of values within a predetermined range of the timing signal.

11. A parallel to serial converter comprising:

a parallel data input operable to receive parallel data, the parallel data having an associated clock signal;

an associated clock signal input operable to receive the associated clock signal;

a serial data output operable to transmit serial data; and a phase aligner circuit operable to synchronize the parallel data to an internal timing signal, the phase aligner circuit comprising:

a comparator circuit operable to compare the associated clock signal to an internal timing signal; and a phase shift circuit operable to adjust the count of a counter if the associated clock input transitions from the first set of values to the second set of values within a predetermined range of the internal timing signal, wherein the phase shift circuit is operable to adjust the count of a counter if the clock input transitions from a first set of values to a second set of values when the internal timing signal has a first value.

12. The parallel to serial converter of claim 11 wherein the internal timing signal has the same frequency as the associated clock signal.

13. The parallel to serial converter of claim 11 wherein the comparator circuit is further operable to:

filter the associated clock input signal to produce a filtered clock input; and compare the filtered clock input to the internal timing signal by determining if the filtered clock input and the internal timing signal have the same value.

14. The parallel to serial converter of claim 13 wherein the phase shift circuit is further operable to selectively invert the most significant bit of the counter.

15. The parallel to serial converter of claim 11 wherein the comparator circuit further comprises:

a oneshot operable to produce a pulse signal based on the associated clock signal; and a comparator operable to compare the values of the pulse signal and the internal timing mechanism.

16. The parallel to serial converter of claim 11 and further comprising a reshift circuit operable in conjunction with the phase shift circuit to compare the associated clock signal to the internal timing signal and adjust the count of the counter if the clock input transitions from the first set of values to the second set of values within a predetermined range of the timing signal.

* * * * *

UNITED STATES PATENT AND TRADEMARK OFFICE
CERTIFICATE OF CORRECTION

PATENT NO.    : 5,990,813
DATED         : November 23, 1999
INVENTOR(S)   : Timothy A. Teneyck It is certified that error appears in the above-identified patent and that said Letters Patent is hereby corrected as shown below:

Title page,
Insert Item [60], Related U.S. Application Data, as follows:
-- Provisional Application No. 60/025,032 filed 08/27/1996. --

Signed and Sealed this

Eleventh Day of February, 2003

JAMES E. ROGAN
*Director of the United States Patent and Trademark Office*